United States Patent
Tucker et al.

(10) Patent No.: US 7,437,556 B2
(45) Date of Patent: Oct. 14, 2008

(54) GLOBAL VISIBILITY CONTROLS FOR OPERATING SYSTEM PARTITIONS

(75) Inventors: Andrew G. Tucker, Menlo Park, CA (US); John T. Beck, San Jose, CA (US); David S. Comay, Oakland, CA (US); Andrew D. Gabriel, Fleet (GB); Ozgur C. Leonard, San Mateo, CA (US); Daniel B. Price, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 837 days.

(21) Appl. No.: 10/763,147

(22) Filed: Jan. 21, 2004

(65) Prior Publication Data

US 2005/0021788 A1    Jan. 27, 2005

Related U.S. Application Data

(60) Provisional application No. 60/469,558, filed on May 9, 2003.

(51) Int. Cl.
*H04L 9/34* (2006.01)
*H04L 12/22* (2006.01)
*H04L 9/32* (2006.01)

(52) U.S. Cl. .................. 713/164; 713/165; 713/166

(58) Field of Classification Search .......... 713/164–168
See application file for complete search history.

(56) References Cited

U.S. PATENT DOCUMENTS

| | | | |
|---|---|---|---|
| 5,155,809 A | 10/1992 | Baker et al. | |
| 5,283,868 A | 2/1994 | Baker et al. | |
| 5,291,597 A | 3/1994 | Shorter et al. | |
| 5,325,517 A | 6/1994 | Baker et al. | |
| 5,325,526 A | 6/1994 | Cameron et al. | |
| 5,437,032 A | 7/1995 | Wolf et al. | |
| 5,590,314 A | 12/1996 | Ueno et al. | |
| 5,784,706 A | 7/1998 | Oberlin et al. | |
| 5,841,869 A * | 11/1998 | Merkling et al. | 713/164 |
| 5,845,116 A | 12/1998 | Saito et al. | |

(Continued)

FOREIGN PATENT DOCUMENTS

EP    389151 A2 *    9/1990

(Continued)

OTHER PUBLICATIONS

U.S. Appl. No. 10/833,474, filed Apr. 27, 2004.

(Continued)

*Primary Examiner*—Gilberto Barron, Jr.
*Assistant Examiner*—Venkat Perungavoor
(74) *Attorney, Agent, or Firm*—Hickman Palerman Truong & Becker LLP

(57) ABSTRACT

In accordance with one embodiment of the present invention, there is provided a mechanism for managing and controlling global visibility of resources in zones within an operating system controlled by a single kernel instance. Embodiments enable isolation and virtualization of processes within a single image of an operating system, without requiring implementation of hardware support (such as the introduction of an additional privilege level) to isolate privileged programs, and without multiple instances of an operating system or operating system kernel for some applications.

22 Claims, 14 Drawing Sheets

U.S. PATENT DOCUMENTS

| | | | |
|---|---|---|---|
| 5,963,911 A | | 10/1999 | Walker et al. |
| 6,064,811 A | * | 5/2000 | Spilo et al. ................. 718/104 |
| 6,074,427 A | | 6/2000 | Fought et al. |
| 6,075,938 A | | 6/2000 | Bugnion et al. |
| 6,279,046 B1 | | 8/2001 | Armstrong et al. |
| 6,289,462 B1 | | 9/2001 | McNabb et al. |
| 6,438,594 B1 | | 8/2002 | Bowman-Amuah |
| 6,557,168 B1 | | 4/2003 | Czajkowski |
| 6,633,963 B1 | * | 10/2003 | Ellison et al. ............... 711/163 |
| 6,681,238 B1 | | 1/2004 | Brice et al. |
| 6,681,258 B1 | | 1/2004 | Ratcliff et al. |
| 6,701,460 B1 | * | 3/2004 | Suwandi et al. ............... 714/41 |
| 6,725,457 B1 | | 4/2004 | Priem et al. |
| 6,738,832 B2 | | 5/2004 | Burr et al. |
| 6,792,514 B2 | | 9/2004 | Kapoor et al. |
| 6,813,766 B2 | | 11/2004 | Hay |
| 6,859,926 B1 | | 2/2005 | Brenner et al. |
| 6,944,699 B1 | | 9/2005 | Bugnion et al. |
| 6,957,435 B2 | | 10/2005 | Armstrong et al. |
| 6,961,941 B1 | | 11/2005 | Nelson et al. |
| 6,993,762 B1 | | 1/2006 | Pierre |
| 7,051,340 B2 | | 5/2006 | Fisher et al. |
| 7,076,634 B2 | | 7/2006 | Lambeth et al. |
| 7,095,738 B1 | | 8/2006 | Desanti |
| 7,096,469 B1 | | 8/2006 | Kubala et al. |
| 7,188,120 B1 | | 3/2007 | Leonard et al. |
| 2002/0069369 A1 | | 6/2002 | Tremain |
| 2002/0083367 A1 | | 6/2002 | McBride et al. |
| 2002/0120660 A1 | | 8/2002 | Hay et al. |
| 2002/0124072 A1 | | 9/2002 | Tormasov et al. |
| 2002/0156824 A1 | | 10/2002 | Armstrong et al. |
| 2002/0161817 A1 | | 10/2002 | Dorofeev et al. |
| 2002/0173984 A1 | | 11/2002 | Robertson et al. |
| 2002/0174215 A1 | | 11/2002 | Schaefer |
| 2003/0014466 A1 | | 1/2003 | Berger et al. |
| 2003/0069939 A1 | | 4/2003 | Russell |
| 2004/0010624 A1 | | 1/2004 | Garofalo et al. |
| 2004/0162914 A1 | | 8/2004 | St. Pierre et al. |
| 2004/0210760 A1 | | 10/2004 | McGrath et al. |
| 2004/0215848 A1 | | 10/2004 | Craddock et al. |

FOREIGN PATENT DOCUMENTS

| | | | |
|---|---|---|---|
| EP | 1043658 | A1 | 10/2000 |
| EP | 1 253 516 | A2 | 10/2002 |
| EP | 1282038 | A2 | 2/2003 |
| EP | 1300766 | A | 4/2003 |
| GB | 2301912 | A | 12/1996 |
| WO | WO 00/45262 | A2 | 8/2000 |
| WO | WO 02/061554 | A1 | 8/2002 |

OTHER PUBLICATIONS

U.S. Appl. No. 10/767,118, filed Jan. 28, 2004.
U.S. Appl.No. 10/767,117, filed Jan. 28, 2004.
U.S. Appl. No. 10/744,360, filed Dec. 22, 2003.
U.S. Appl. No. 10/767,003, filed Jan. 28, 2004.
U.S. Appl. No. 10/762,067, filed Jan. 20, 2004.
U.S. Appl. No. 10/762,066, filed Jan. 20, 2004.
U.S. Appl. No. 10/767,235, filed Jan. 28, 2004.
U.S. Appl. No. 10/771,827, filed Feb. 3, 2004.
U.S. Appl. No. 10/771,698, filed Feb. 3, 2004.
U.S. Appl. No. 10/768,303, filed Jan. 29, 2004.
Official Action from EPO for foreign patent application No. 04 252 690.5-2211 dated Jun. 10, 2005 (6 pgs)-attached.
Current Claims in EPO patent application No. 04 252 690.5-2211 (9 pgs)-attached.
European Patent Office, "European Search Report," application No. 04252689.7, mailing date Jul. 28, 2005, 3 pages.
Current Claims, European patent application 04252689.7, 6 pages.
Sun Microsystems, "Sun Enterprise™ 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.
U.S. Appl. No. 10/762,066, filed Jan. 20, 2004, Office Action Mailing Date Jul. 10, 2006.
Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).
Sun Microsystems, Inc. entitled Server Virtualization with Trusted Solaris™ 8 Operating Environment, by Glenn Faden, Sun BluePrints™ OnLine-Feb. 2002, http://www.sun.com/blueprints, (21 pgs).
Network Working Group entitled "IP Version 6 Addressing Architecture", by R. hinden, Nokia, S. Deering, Cisco System, dtd Jul. 1998, (28 pgs).
IBM entitled Partitioning for the IBM eserver pSeries 690 System, © Copyright IBM Corp. 2001 (12 pgs).
IBM System Partitioning on IBM eserver xSeries Servers entitled "Effective Server Consolidation and Resource Management with System Partitioning" by Mark T. Chapman, IBM Server Group, dtd Dec. 2001, (23 pgs).
Virtual Private Servers and Security Contexts, dtd May 10, 2004, http://www.solucorp.qc.ca/miscpri/s_content.hc?pfjstate=1 &nodoc=0, (2 pgs).
SunSoft, a Sun Microsystems, Inc. Business entitled "File System Administration", © 1994 Sun Microsystems, Inc., (62 pgs).
"CHMOD—Change the Permission Mode of a File," Internet Citation, Dec. 4, 2000, XP007901399, Retrieved from the internet at http://www.cse.msu.edu/cgi-bin/man2html?chmod?1?/usr/man, retrieved in Dec. 4, 2006, 7 pages.
"SETFACL—Modify the Access Control List (ACL) for a File or Files," Internet Citation, Dec. 11, 2001, XP007901398, Retrieved from the Internet at http://www.cse.msu.edu/cgi-bin/man2html?setfacl?1?/usr/man, retrieved on Dec. 4, 2006, 4 pages.
Vance, Ashlee, "Solaris 10 to get Zoned," The Register, Apr. 9, 2003, XP007901426, located on the internet at http://www.theregister.co.uk/2003/04/09/solaris, retrieved on Dec. 7, 2006, 2 pages.
European Patent Office, "European Search Report," App. No. 04252691.3, dated Dec. 21, 2006, 4 pages.
Current Claims, App. No. 04252691.3, 7 pages.
Hall, Brian "BeeJ", "Beej's Guide to Network Programming—Using Network Sockets," Copyright 1995-2001 by Brian "Beej" Hall, XP007901423, pp. 1-49.
Hall, Brian Beej, "Memory Mapped Files," Copyright 1997 by Brian "Beej" Hall, XP007901425, located on the internet at http://www.ecst.csuchico.edu/{beej/guide/ipc/mmap.html, retrieved on Dec. 7, 2006, 4 pages.
Hall, Brian Beej, "Shared Memory Segments," Copyright 1997 by Brian "Beej" Hall, XP007901424, located on the internet at http://www.ecst.csuchico.edu/{beej/guide/ipc/shmem.html, retrieved on Dec. 7, 2006, 5 pages.
Hall, Brian Beej, "FIFOs," Copyright 1997 by Brian "Beej" Hall, XP007901420, located on the Internet at http://www.ecst.csuchico.edu/{beej/guide/ipc/fifos.html, retrieved on Dec. 7, 2006, 6 pages.
IBM, "Privilege Control Mechanism, for INIX Systems," IBM Technical Disclosure Bulletin, vol. 34, No. 7B, Dec. 1991, XP000282651, pp. 477-479.
European Search Report from the European Patent Office for Foreign Patent Application No. 04252690.5 (3 pgs.).
Claims As Filed in European Patent Application No. 04252690.5 (6 pgs).
Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.
Hope, Paco, "Using Jails in FreeBSD for Fun and Profit", ;Login: The Magazine of Usenix and Sage, vol. 27, No. 3, Jun. 2002, 9 pages.
Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.

Thompson, K., "UNIX Implementation", Bell Laboratories, The Bell System Technical Journal, 1978, pp. 1-9.

U.S. Appl. No. 10/767,003, filed Jan. 28, 2004, Office Action Mailing Date May 31, 2007.

U.S. Appl. No. 10/744,360, filed Dec. 22, 2003, Office Action Mailing Date Apr. 18, 2007.

Czajkowski, G., "Application isolation in the Java Virtual Machine", 2000, ACM Press, Proceedings of the 15th ACM Sigplan Conference on Object-Oriented Programming, Systems, Languages, and Applications, pp. 354-366.

Czajkowski, G., "Multitasking without compromise: a virtual machine evolution", ACM Press, Proceedings of the 16th ACM Sigplan Conference on Object Oriented Programming, Systems, Languages, and Applications, dated Oct. 2001, pp. 125-138.

Osman, S., et al., "The design and implementation of Zap: a system for migrating computing environments", SIGOPS Operating System, Rev. 36, SI, dated Dec. 2000, pp. 361-376.

Presotto et al., "Interprocess Communication in the Ninth Edition Unix System", John Wiley & Sons, Ltd., dated Mar. 1990, 4 pages.

Stevens, "Advanced programming in the Unix Environment", Addison-Wesley, 1993, pp. 427-436.

Watson, "TrustedBSD—Adding Trusted Operating System Features to FreeBSD", The USENIX Association, 2001, 14 pages.

Noordende et al., "Secure and Portable Confinement of Untrusted Programs", ACM, 2002, 14 pages.

Hope, "Using Jails in FreeBSD for fun and profit", ;Login: The Magazine of USENIX &SAGE, vol. 27, No. 3, dated Jun. 2002, pp. 48-55.

Poul-Henning Kamp, et al., "Jails: Confining the omnipotent root", 2nd Intl System Administration and Networking Conference Proceedings "SANE 2000", May 22-25, 2000, Maastricht, The Netherlands.

Mc Dougall, Richard, et al., "Resource Management", Prentice Hall, 1999, 25 pages.

* cited by examiner

312 ENABLE VISIBILITY OF OBJECT 234 IN GLOBAL ZONE 130 BY PROCESS 232 IN THE GLOBAL ZONE 130 AND VISIBILITY OF OBJECT 244 IN THE NON-GLOBAL ZONE 140 BY PROCESS 232 IN THE GLOBAL ZONE 130
(FIG. 3D)

314 ENABLE ACCESS TO OBJECT 234 IN GLOBAL ZONE 130 BY PROCESS 232 IN THE GLOBAL ZONE 130 BUT SELECTIVELY RESTRICT ACCESS TO OBJECT 244 BY PROCESS 232 IN THE GLOBAL ZONE 130
(FIG. 3E)

FIG. 3A
BLOCK 310

*Fig. 3B*

```
┌─────────────────────────────────────────────┐
│ 322 ENABLE VISIBILITY OF OBJECT 244 IN NON-GLOBAL ZONE │
│  140 BY PROCESS 174-1 IN THE NON-GLOBAL ZONE 140 BUT   │
│   RESTRICT VISIBILITY OF OBJECT 234 IN THE GLOBAL ZONE │
│    130 BY PROCESS 174-1 IN THE NON-GLOBAL ZONE 140     │
│                     (FIG. 3F)                          │
└─────────────────────────────────────────────┘
                        │
                        ▼
┌─────────────────────────────────────────────┐
│      324 ENABLE ACCESS TO OBJECT 244 IN     │
│       NON-GLOBAL ZONE 140 BY PROCESS        │
│      174-1 IN THE NON-GLOBAL ZONE 140 BUT   │
│       RESTRICT ACCESS TO OBJECT 234 IN THE  │
│       GLOBAL ZONE 130 BY PROCESS 174-1 IN   │
│            THE NON-GLOBAL ZONE 140          │
│                    (FIG. 3G)                │
└─────────────────────────────────────────────┘
                        │
                        ▼
                 ┌──────────────┐
                 │   FIG. 3A    │
                 │  BLOCK 320   │
                 └──────────────┘
```

*Fig. 3C*

332 RECEIVING AN IDENTIFIER ASSOCIATED WITH GLOBAL ZONE 130

334 REFLECTING A PROCESS TABLE FROM AN OPERATING SYSTEM KERNEL TO A SUBDIRECTORY OF THE ROOT DIRECTORY OF THE FILE SYSTEM ASSOCIATED WITH THE OPERATING SYSTEM

FIG. 3B
BLOCK 312

*Fig. 3D* global # *zoneadm list −v*   402

| ID NAME | STATE | PATH |
|---|---|---|
| 0 global | running | / |
| 100 my-zone | running | /aux0/my-zone |

(404)

global # *ps -e -o pid, zoneid, comm*   406

```
    0      0 sched
    0      0 /etc/init
  ...
100180     0 /usr/lib/netsvc/yp/ypbind
100228     0 /usr/lib/autofs/automountd
100248     0 /usr/sbin/nscd
103152   100 /usr/sbin/inetd
  ...
103148   100 /usr/lib/autofs/automountd
103141   100 /usr/lib/netsvc/yp/ypbind
```
(408)

global # *zlogin my-zone ps -e -o pid, zoneid, comm*   410

```
PID ZONEID COMMAND 103130   100  zsched
103148   100  /usr/lib/autofs/automountd
103141   100  /usr/lib/netsvc/yp/ypbind
103152   100  /usr/sbin/inetd
103139   100  /usr/sbin/rpcbind
103143   100  /usr/sbin/nscd
```
(412)

*Fig. 4*

GLOBAL VISIBILITY CONTROLS FOR OPERATING SYSTEM PARTITIONS

CLAIM OF PRIORITY

This application claims benefit of Provisional Application No. 60/469,558, filed May 9, 2003, entitled "OPERATING SYSTEM VIRTUALIZATION," by Andrew G. Tucker, et al., the entire contents of which are incorporated by reference as if fully set forth herein.

BACKGROUND

Many of today's computing systems include computing resources that are not fully utilized. Such underutilization provides a potential opportunity to the owners of these systems to obtain greater capacity or cost reduction through improving utilization of these computing resources.

A number of approaches could be used to address the problem of improving utilization, including consolidation of multiple applications onto a single hardware platform. Consolidation approaches typically attempt to support the co-existence of multiple applications on a single unit of hardware in order to achieve greater function from fewer hardware platforms. A variety of computing resource management techniques could be used for this purpose.

Such computing resource management extensions, however, must address security and management issues arising from the concurrent execution of multiple applications on a single platform. For example, if web server applications belonging to two or more "untrusting" parties, i.e., market competitors, for example, are co-located on a single hardware platform, neither party will be content with the other party's having access to that party's private information. Some computer system functions, including for example, facilities to allocate and use hardware resources, i.e., network connections, DASD, output devices, and so forth, file system resources and communications resources could be used by one untrusting party to access the information or applications of another party if access is not controlled. Accordingly, in environments where users do not trust each other to perform system resource related tasks, the system administrator may be burdened with responsibility of performing each action involving critical system resources at significant time and expense.

One approach to the utilization and security issues arising in consolidation techniques is to partition machine resources among a number of logical partitions (LPARs) or virtual partitions (VPARs), effectively creating multiple machine images on a single platform. Such logical partitioning approaches potentially provide complete isolation among applications based in different machine images. A number of issues arise, however, with logical partitioning approaches. Such approaches may require implementation of hardware support (such as the introduction of an additional privilege level) to isolate privileged programs such as operating system kernels. Also, logical partitioning may require that the system administrator manage the configuration for the logical partitions and the allocation of resources among the logical partitions.

In another possible approach, one or more instances of operating system images that execute concurrently on a single hardware platform provide a plurality of "Virtual Machines." In such approaches, each virtual machine may be a separate operating system instance that provides isolation for programs running in the virtual machine from other programs running in a second virtual machine. While such virtual machine approaches provide isolation between applications, other issues with such approaches may arise. For example, it may not be necessary, or even desirable to have multiple instances of an entire operating system for some applications. The complexity of administration and management for different operating systems images may weigh in favor of more simplified approaches.

Another approach would be to implement compartmentalization into a number of operating system functions. For example, some operating systems employing hierarchical file systems include a function to provide a level of compartmentalization by limiting file system access to a particular process. Such mechanisms, however, also suffer drawbacks. For example, a process's visibility of the file system name space may be limited to a single subtree of the file system in many implementations. Thus, compartmentalization typically does not extend to the process or networking spaces, making observation and interference by other processes possible.

A yet further approach would be to confine a process and its progeny (i.e., parent and children) to compartmentalized allocations of system resources, i.e., file system, network facilities, and so forth. In this approach, a process placed in such a compartment, termed a "Jail," would have access to allocated system resources, but no visibility nor access to files, processes or network services outside of the Jail. A number of issues arise with the Jails approach, as well. Typically, Jails have no independent existence apart from the process for which the Jail is created. In other words, once the process creating the Jail (and its progeny, if any) terminates, the Jail terminates. Also, a second process cannot "join" a Jail.

SUMMARY

Some embodiments provide techniques for managing visibility and access to objects by processes in a single kernel instance operating system environment that has been partitioned into a global zone and one or more non-global zones. Visibility and access management includes controlling the ability of processes in one zone to observe objects in another zone and the ability of processes in one zone to access objects in another zone. Isolation and virtualization of processes within a single operating system image may be achieved in one embodiment by providing processes in non-global zones visibility and access exclusively to objects within the non-global zone. In addition to visibility and access to objects in the global zone, processes in the global zone may have permission to view objects in the non-global zones. In some embodiments, processes in the global zone may obtain permission to access objects in the non-global zones.

The zones comprise persistent virtual environments. Zones are persistent because a zone may exist for longer period of time than the life of any one process in that zone. Zones are virtual environments because each zone provides a semi-autonomous environment to one or more processes that comprises the functional equivalent of a physical machine. In one embodiment, processes in the global zone are allowed to observe processes and other objects in non-global zones, as well as in the global zone. This allows such global zone processes to have system-wide observability. The ability of processes in the global zone to control or send signals to processes in other zones, however, is restricted in one embodiment by use of a new privilege. In one embodiment, processes in the global zone must hold the privilege in order to access or control processes or objects in the non-global zones, as will be described herein.

In one embodiment, a separate image of a system table of process information is provided to each zone using the file system in order to enable users and processes in the zone to view or access processes or objects in the other zones but to block users from viewing and accessing objects in other zones. In this embodiment, file system permissions can be used to enforce controls on visibility and access of file system related objects. For example, processes executing within a zone may be provided file system access permissions for the file system directories relating to that zone, but will be prevented from accessing other areas of the file system outside of the zone.

Because many applications assume that a tree like hierarchy of processes exists in the operating system environment, processes in a non-global zone that have parent processes outside of the zone are indicated as having a particular generic parent process, called init in one embodiment, that is made visible to processes and users within each zone. Similarly, the scheduler process, called sched in one embodiment, is visible to users and processes in each zone. Thus, in one embodiment, process 0 (sched) and process 1 (init) are visible within each zone, including the global zone.

In one embodiment, the global zone includes a system table in its file system, which includes information about all processes in the system. By accessing this file system, processes and users in the global zone can view the status of the entire operating system environment.

Before startup, a system administrator configures the zones using administrative commands. In configuring a non-global zone, an administrator may specify a number of different parameters, including, but are not limited to, a zone name, a zone path to the root directory of the zone, specification of one or more file systems to be mounted when the zone is created, specification of zero or more network interfaces, specification of devices to be configured when the zone is created, and zero or more resource controls to be imposed on the zone.

At startup, one or more of the configured non-global zones may be booted. When a non-global zone has been configured, it means that an administrator in the global zone has invoked certain services of the kernel to specify all of the configuration parameters for the non-global zone and has saved that configuration in persistent physical storage. During the boot process, portions of file systems are mounted for each individual zone that has been configured in order to instantiate the zones. It is not necessary for the zone to have an active user process running within it in even after it has been booted.

During runtime, one or more privileges may be checked when access to computing environment objects or computing resources are requested. In addition, the selected mounting of file system resources to portions of the file system associated with individual zones enforces visibility and access limitations on processes in individual zones. In one embodiment, processes running within the non-global zone are limited to viewing and accessing objects only within that non-global zone. In one embodiment, processes associated with the global zone have visibility and access to objects within the global zone, as well as visibility to objects in non-global zones.

The ability to control or send signals to processes in other zones, however, is restricted by a new privilege, called PRIV_PROC_ZONE in one embodiment. The new privilege allows processes to override the restrictions placed on unprivileged processes. In one embodiment, the restriction that is placed on unprivileged processes in the global zone is that these processes cannot signal or control processes in other zones. This is true even in cases where the user ids of the processes match or the acting process has the PRIV_PROC_OWNER privilege. Also, the PRIV_PROC_ZONE privilege can be removed from otherwise privileged processes to restrict potentially destructive actions to the global zone.

Some embodiments can provide secure virtualization and isolation among processes by executing the processes concurrently in one or more discrete zones of the application environment but selectively provide visibility and/or access to data objects and processes among the zones via a global zone. Some embodiments can provide virtualization and isolation among coexisting, concurrently executing processes, without requiring implementation of hardware support (such as the introduction of an additional privilege level) to isolate privileged programs, and without multiple instances of an operating system kernel for some applications.

BRIEF DESCRIPTION OF THE DRAWINGS

FIGS. 3A-3H are operational flow diagrams illustrating the operation of one embodiment of the present invention.

FIG. 4 is an example listing of processes present in one embodiment of the present invention.

DETAILED DESCRIPTION OF THE EMBODIMENT(S)

System Overview

Figure 1:
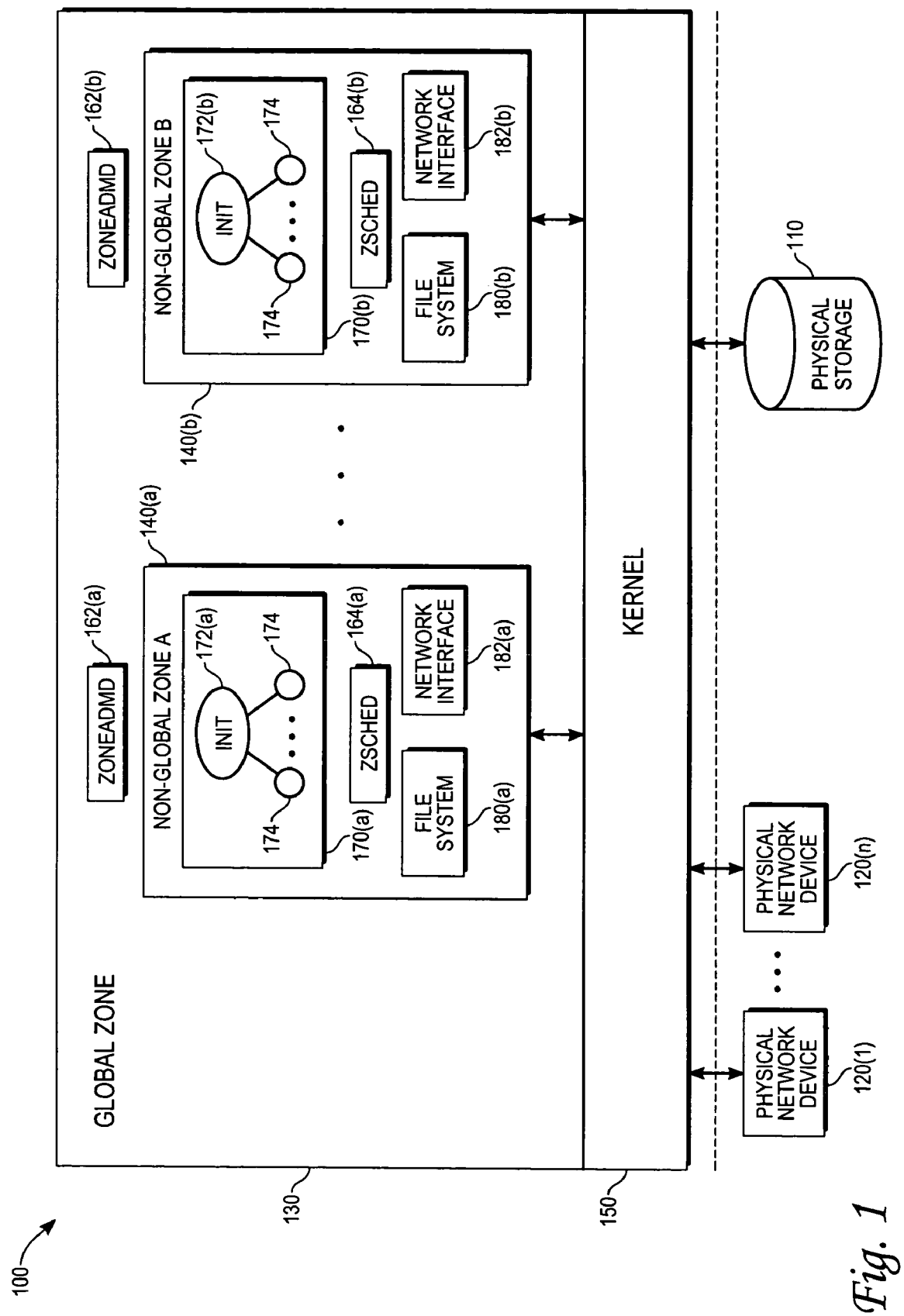
FIG. 1 is a functional block diagram of an operating system environment in which one embodiment of the present invention may be implemented.

Visibility and access management in some embodiments includes controlling the ability of processes in one zone to observe objects in another zone and the ability of processes in one zone to access objects in another zone. In one embodiment, processes in the global zone are allowed to observe processes and other objects in non-global zones, as well as in the global zone. This allows such global zone processes to have system-wide observability. The ability of processes in the global zone to control or send signals to processes in other zones, however, is restricted in one embodiment by use of a new privilege. In one embodiment, processes in the global zone must hold the privilege in order to access or control processes or objects in the non-global zones, as will be described herein.

In general, in some embodiments, the present invention provides methods, apparatus and computer program products for managing access to resources in a computer operating system environment. According to one embodiment, a computer based method for managing resources in an operating system environment controlled by a single kernel instance is provided. The method includes creating a global zone and at least one non-global zone. Processes of the global zone may be permitted to view and access objects in the global zone and view objects in non-global zones. Processes of the non-global zone may be permitted to view and access objects only in the non-global zone. The method also includes selectively permitting upon authorized request, a process of the global zone to access objects in a non-global zone.

In another embodiment, a method for managing resources in a computer operating system includes establishing a global zone and establishing one or more non-global zones. The method further includes selectively limiting visibility and/or access by processes associated with the global zone to objects within the global zone and select objects within the one or more non-global zones. The method still further includes limiting visibility and access by processes associated with each non-global zone to objects within that non-global zone. The method enables the global zone and the one or more non-global zones to exist concurrently in a single kernel image operating system.

In one variation, the method includes receiving a request from a requesting process associated with the global zone for visibility and/or access to an object in a non-global zone. The method also includes determining whether the requesting process is authorized for the requested visibility and/or access. If the requesting process is authorized, selectively changing visibility and/or access for the requesting process in accordance with the request is also part of the method. Some embodiments may enable the requesting process to obtain visibility and/or access to objects within the global zone and one or more non-global zones.

In an alternative variant, a default is provided. For example, in one embodiment, access for processes associated with the global zone defaults to objects within the global zone and visibility for processes associated with the global zone defaults to objects within the global zone and objects within at least one non-global zone. The method includes receiving a request from a requesting process associated with the global zone for access to an object in an non-global zone and, if the requesting process is authorized, selectively changing access of the requesting process in accordance with the request.

In another embodiment, the method includes receiving an identifier indicating a zone selected from one or more of the global zone and a non-global zone. Mounting file system resources comprising processes to be executed in the zone indicated by the identifier to a portion of a file system associated with the zone indicated by the identifier can also be part of the method. In some embodiments, the method can enable the processes of the file system resources to obtain visibility and/or access to objects within the zone corresponding to the identifier.

In one embodiment, file system resources are mounted to a subdirectory of a root directory of a portion of a file system associated with the zone indicated by the identifier so that processes expecting a tree like directory structure to execute within the zone indicated by the identifier.

In one embodiment, select processes can be made visible to all other processes in the global zone and the non-global zone, enabling processes expecting a tree like calling structure among the processes in the zone to see the specific processes as the root of the tree.

In a further embodiment, a system is provided. The system comprises a processor and a memory connected with the processor. The memory can be operative to hold at least one of a plurality of program processes, which may include instructions for providing an operating system and instructions for establishing and managing a plurality of zones within a single image of the operating system. Further, the system may include instructions for creating a global zone and one or more non-global zones. Instructions for permitting processes attached to the global zone to view and access objects in the global zone and view objects in non-global zones may also be included in the system. Further, the system may include instructions for permitting processes attached to the non-global zone to view and access objects only in the non-global zone. Instructions for selectively permitting upon authorized request, a process attached to the global zone to access objects in a non-global zone are also included in the system.

Some embodiments can provide secure virtualization and isolation among processes by executing the processes concurrently in one or more discrete zones of the application environment but selectively provide visibility and/or access to data objects and processes among the zones via a global zone. Some embodiments can provide virtualization and isolation among coexisting, concurrently executing processes, without requiring implementation of hardware support (such as the introduction of an additional privilege level) to isolate privileged programs, and without multiple instances of an operating system kernel for some applications.

FIG. 1 illustrates a functional block diagram of an operating system (OS) environment 100 in accordance with one embodiment of the present invention. OS environment 100 may be derived by executing an OS in a general-purpose computer system, such as computer system 500 illustrated in FIG. 5, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows™, MacOS™, etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or affect the network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many applications. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes 170 in one non-global zone 140 are not able to access or affect processes 170, file systems 180, and network interfaces 182 of another zone (non-global or global). In addition to enforcing the zone boundaries, kernel 150 also provides a number of other services. These services include but are certainly not limited to mapping the network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg(1m)) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource pool associations.

Once a zone is in the Configured state, a global administrator may invoke another operating system utility (in one embodiment, zoneadm(1m)) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm(1 m) again), which causes a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In creating a non-global zone 140, a number of operations are performed, including but not limited to assigning a zone ID, starting a zsched process 164 (zsched is a kernel process; however, it runs within the non-global zone 140, and is used to track kernel resources associated with the non-global zone 140), mounting file systems 180, plumbing network interfaces 182, configuring devices, and setting resource controls. These and other operations put the non-global zone 140 into the Ready state to prepare it for normal operation.

Putting a non-global zone 140 into the Ready state gives rise to a virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer. Notice that when a non-global zone 140 is in the Ready state, no user or non-kernel processes are executing inside the zone (recall that zsched is a kernel process, not a user process). Thus, the virtual platform provided by the non-global zone 140 is independent of any processes executing within the zone. Put another way, the zone and hence, the virtual platform, exists even if no user or non-kernel processes are executing within the zone. This means that a non-global zone 140 can remain in existence from the time it is created until either the zone or the OS is terminated. The life of a non-global zone 140 need not be limited to the duration of any user or non-kernel process executing within the zone.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

Visibility and Access Management

Visibility and access management includes controlling the ability of processes in one zone to observe objects in another zone and the ability of processes in one zone to access objects in another zone. In one embodiment, processes in the global zone are allowed to observe processes and other objects in non-global zones, as well as in the global zone. This allows such global zone processes to have system-wide observability. The ability of processes in the global zone to control or send signals to processes in other zones, however, is restricted in one embodiment by use of a new privilege. In one embodiment, processes in the global zone must hold the privilege in order to access or control processes or objects in the non-global zones, as will be described herein.

Figure 2A:
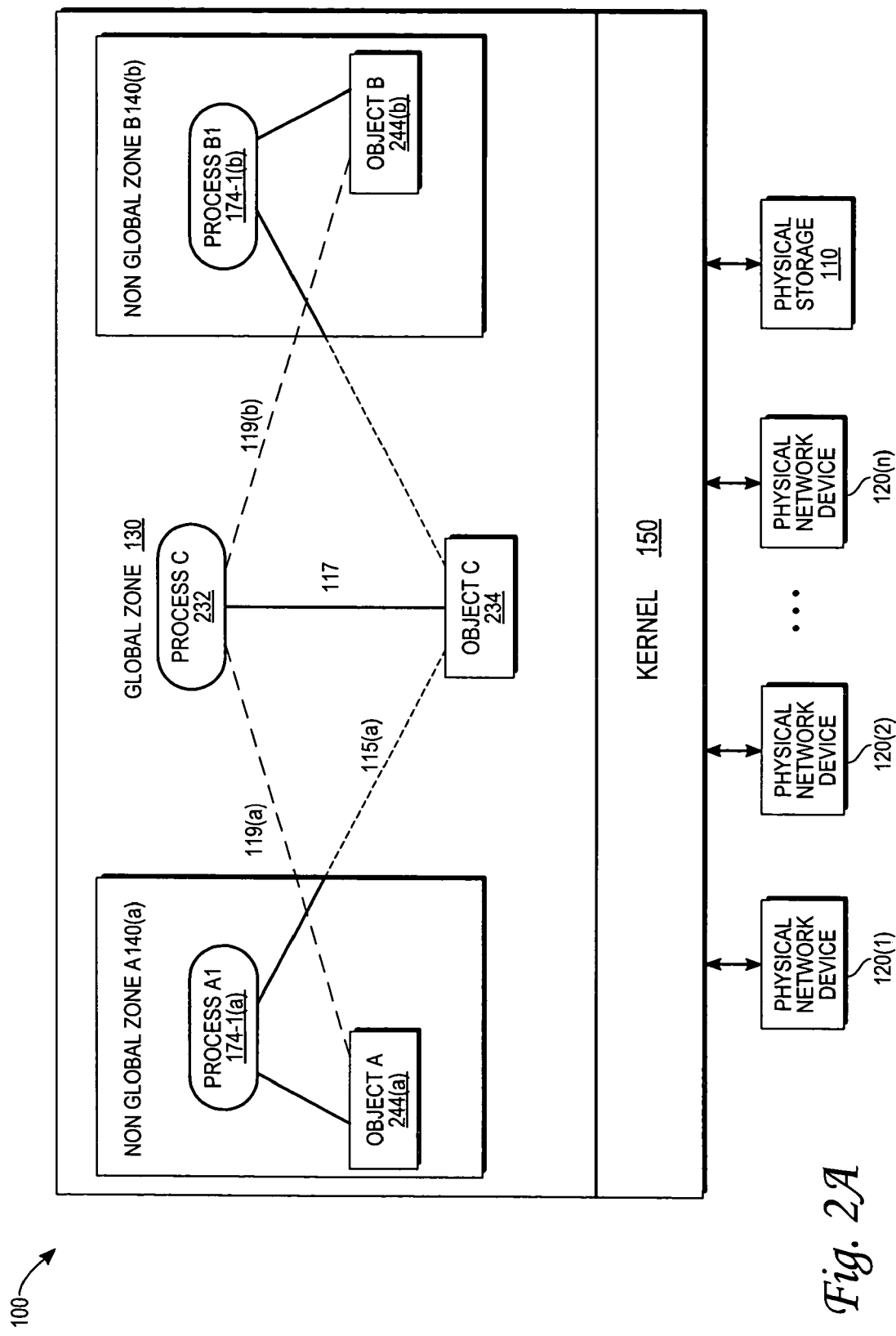
FIG. 2A is functional block diagram of example processes in an operating system environment of FIG. 1 in which one embodiment of the present invention may be implemented.

FIG. 2A is functional block diagram of example processes in an operating system environment of FIG. 1 in which one embodiment of the present invention may be implemented. As shown in FIG. 2A, during runtime, operating system environment 100 provides a plurality of zones, including non-global zone A 140(*a*) and non-global zone B 140(*b*), referred to collectively herein as non-global zones 140. Non-global zones 140 are persistent environments because they may have a lifetime longer than any of the processes associated with them. Further, non-global zones 140 provide a virtualized environment because they are capable of supporting the isolated execution of processes, such as a process A1 174-1(*a*), executing in non-global zone A 140(*a*) and a process B1 174-1(*b*) executing within non-global zone B 140(*b*). Both of non-global zones 140(*a*) and 140(*b*) are able to exist under a single kernel image 150. A process C 232 can execute within global zone 130 of operating system environment 100, as well.

Further with reference to FIG. 2A, the operation of visibility and access management techniques in one embodiment are illustrated by non-global zone A 140(*a*), in which process A1 174-1(*a*) has visibility to and access to an object A 244(*a*) residing within non-global zone A 140(*a*) as indicated by a solid line 113(*a*). Because process A1 174-1(*a*) is assigned to non-global zone A 140(*a*), process A1's visibility and access to objects is limited to only those objects assigned to non-global zone A 140(*a*). Thus, process A1 174-1(*a*) is prohibited from viewing or accessing objects C 234 of global zone 130, as indicated by a small dotted line 115(*a*). Similarly, process B1 174-1(*b*), assigned to non-global zone B 140(*b*), is limited to viewing and accessing only those objects assigned to non-global zone B 140(*b*), such as object B 244(*b*), for example. Further, process A1 and process B1 are prohibited from viewing or accessing objects in each other's non-global zone. Global zone process C 232 is provided visibility and access to object C 234 in global zone 130, as indicated by solid line 117. In one embodiment, since process C 232 is assigned to global zone 130, process C 232 is able to view objects in the non-global zones, such as object A 244(*a*) and object B 244(*b*) as indicated by alternating dashed and dotted line 119. In one embodiment, process C 232 is permitted to access object A 244 or object B 244 provided that process C232 obtains further privileges as will be described herein below.

Figure 2B:
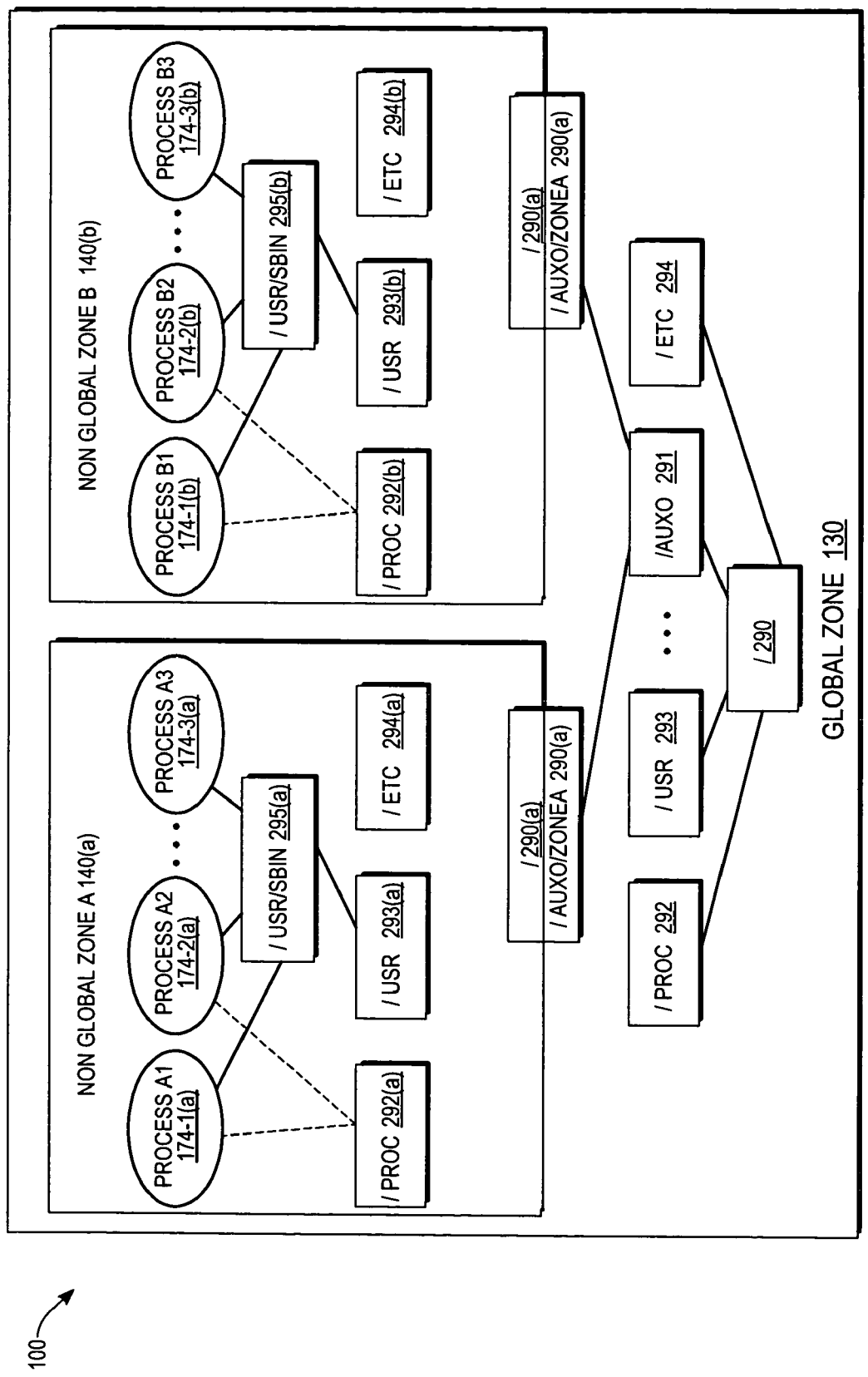
FIG. 2B is functional block diagram of an example file system for the operating system environment of FIG. 2A in which one embodiment of the present invention may be implemented.

FIG. 2B is functional block diagram of an example file system for the operating system environment of FIG. 2A in which one embodiment of the present invention may be implemented. As shown in FIG. 2B, file system 180 of FIG. 1 comprises a number of directories arranged in a hierarchical tree like structure. For example, in non-global zone A 140(*a*), file system 180(*a*) is mounted at a zone root directory 290(*a*). In operating system nomenclature, the root directory is signified by a slash ("/"). Because root directory 290(*a*) is a zone root directory, it will appear to processes within the non-global zone A 140(*a*) to be the root directory. Directory 290(*a*) is a subdirectory of an /AUX0 directory 291, which is part of the file system 180 accessible by processes in the global zone 130. From the point of view of a process in the global zone 130, the directory 290(*a*) is directory /AUX0/zone A 290(*a*).

In one embodiment, the zone's root directory is distinct from the directory set by chroot, a system command for establishing a root directory, for the processes within the zone. Both restrictions are checked in one embodiment, when a process is traversing pathname components. This enables chroot to be used within a zone, but if a process escapes from its chroot restriction, that process will still be unable to escape the zone restriction.

Zone root directory 290(*a*) comprises one or more subdirectories, such as /Proc 292(*a*), /USR 293(*a*), and /ETC 294(*a*). This is not an exhaustive list and other subdirectories may also be included in root directory 290(*a*). These subdirectories may further have subdirectories themselves. For example, the directory /USR/SBIN 295(*a*) is a subdirectory of the directory /USR 293(*a*). A number of processes running in non-global zone A such as a process A1 174-1(*a*), process A2 174-2(*a*) and process A3 174-3(*a*) are instantiated from files stored in directory /USR/SBIN 295(*a*), as is indicated by solid lines 104(*a*), 106(*a*) and 108(*a*).

Referring now to non-global zone B 140(*b*) of FIG. 2B, a separate instance of a file system 180(*b*) is mounted at root directory 290(*b*). Root directory 290(*b*) also comprises one or more subdirectories storing data and/or files of processes such as process B1 174-1(*b*), process B2 174-2(*b*) and process B3 174-3(*b*). In the embodiment of FIG. 2B, the directories and associated structure of the file system 180(*b*) of non-global zone B 140(*b*) is closely analogous to the portions of file system 180(*a*) of non-global zone A 140(*a*), however, this is not necessarily always the case, and implementation specific alternatives will exist. For example, in some embodiments, file system 180(*a*) and file system 180(*b*) may be mapped to a single physical storage in what is known as a loop back file system in one embodiment.

Global zone 130 includes a file system root directory 290 of the operating system environment 100. The file system of global zone 130 also includes one or more subdirectories, such as for example as /PROC 292, /USR 293, and /ETC 294. In one embodiment, root directory /290 includes a sub-directory /AUX0 291, which has as its subdirectories directory /AUX0/zone A 290(*a*) and directory /AUX0/zone B 290(*b*) to implement the zone root directories /290(*a*) and /290(*b*).

The process file system, /PROC or procfs, is a special purpose file system that implements a view of a process table, normally resident in the memory of the kernel 150 of operating system environment 100, inside the file system 180 in the /PROC directory. The /PROC file system is a virtual file system; it is not associated with a block format storage device, but rather exists in memory. The files in the /PROC file system enable processes executing under control of the operating system environment 100 to access information about other active processes. The information in the /PROC file system is normally accessed by programs that provide information about processes running under the operating system environment 100, such as ps(1) utility, for example. In one embodiment, the ps utility displays a header line followed by lines containing information about processes that have controlling terminals, which is sorted by controlling terminal then by process ID.

In one embodiment, the /proc file system is enhanced to provide process visibility and access control based upon the zone association of processes running under operating system environment 100 In one embodiment, process access control can be provided based on the location of the mount; a /proc file system mounted within the part of the file system hierarchy rooted at the root directory of a zone in the Ready or Running state will include only processes within that zone. Referring again to FIG. 2B, zone root directory /290(a) includes a subdirectory /PROC 292(a), which comprises the /PROC file system for zone A. Analogously, zone B includes a subdirectory /PROC 292(b) mounted to the zone root directory 290(b) for zone B.

In one embodiment, file system 180 is mounted to /PROC 292(a) of zone root directory 290(a) so that processes running in non-global zone A such as process A1 174-1(a), process A2 174-2(a) and process A3 174-3(a), are able to access information in /PROC 292(a) relating exclusively to the processes associated with zone A. This relationship is indicated in FIG. 2B by dotted lines 103(a) and 105(a) (a dotted line for process A3 174-3 has been omitted from FIG. 2B for clarity). Analogously, zone B includes a subdirectory /PROC 292(b) mounted to the zone root directory 290(b) for zone B. Zone B's /PROC 292(b) is accessible to processes running in non-global zone B such as process B1 174-1(b), process B2 174-2(b) and process B3 174-3(b). These processes will be restricted to viewing information relating exclusively to processes within zone B by the /PROC 292(b) image of the process table.

In one embodiment, mounts issued from within a non-global zone will only display processes within that zone, since these processes must be mounted within the part of the file system hierarchy accessible from that non-global zone. Mounts issued from the global zone, which are not within the part of the file system hierarchy belonging to any ready or running zone, will reflect all processes in the system.

Because many applications assume that a tree like hierarchy of processes exists in the operating system environment, processes in a non-global zone that have parent processes outside of the zone are indicated as having a parent process, called zsched in one embodiment, which is a kernel process created when the zone is placed in the Ready state. The zsched process appears to processes in the non-global zones to be its own parent in one embodiment. Thus, in one embodiment, process 0 (sched) and process 1 (init) are not visible within the non-global zones.

In one embodiment, the files exported by procfs are enhanced to include data about the zone with which each process is associated. In particular, a zone id may be added to data structures containing process information (available by reading the corresponding files in procfs). In one embodiment, these new additions enable processes in the global zone to determine the zone associations of processes they are observing or controlling.

As discussed above with reference to FIG. 2B, processes in the global zone are permitted to observe processes and other objects in non-global zones in one embodiment. This allows such processes to have system-wide observability. The ability to control or send signals to processes in other zones, however, is restricted by a new privilege, which must be obtained by a process in the global zone in order to access or control an object in a non-global zone in one embodiment.

Figure 2C:
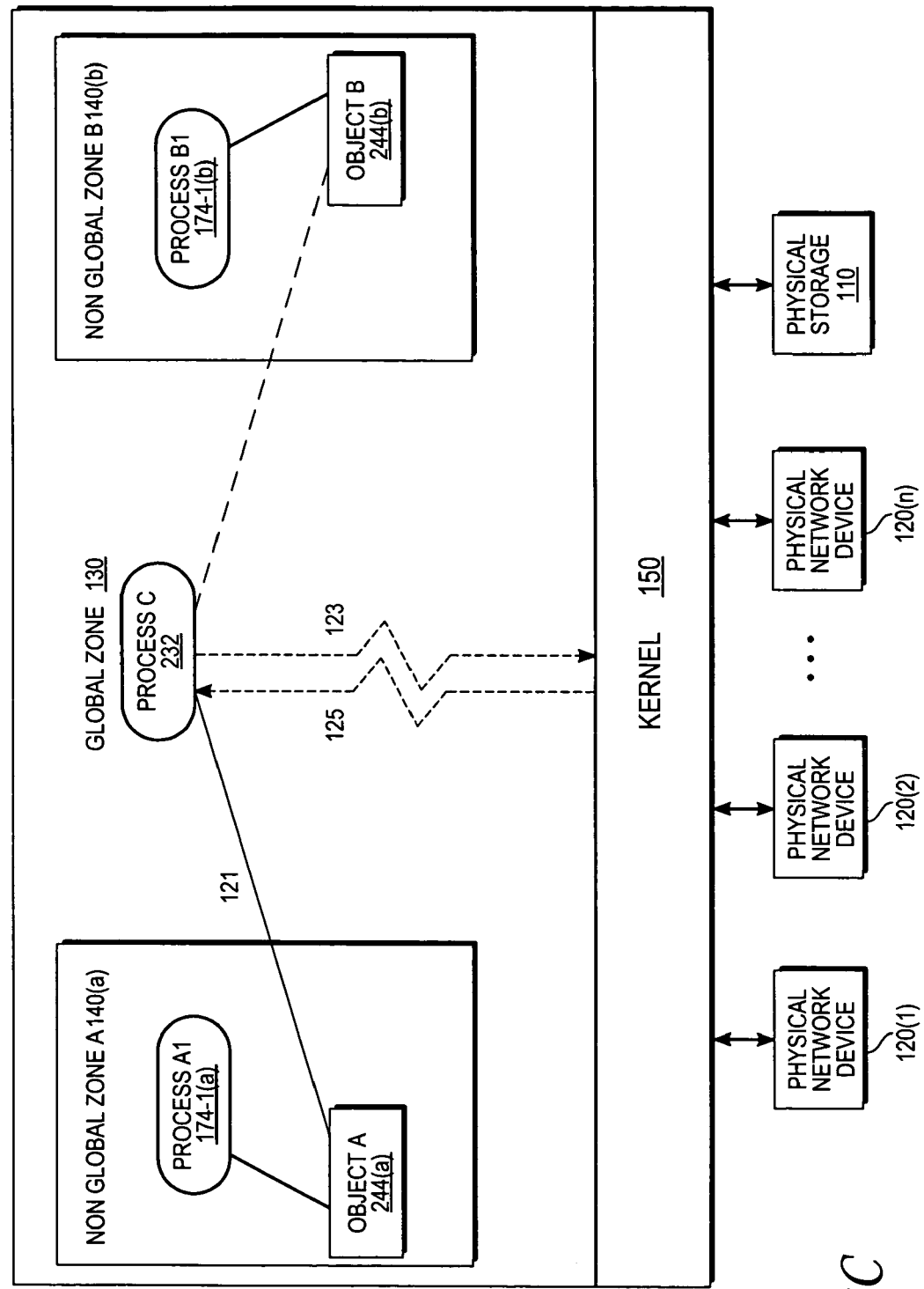
FIG. 2C is functional block diagram of an example process of obtaining permission to access a non-global zone object in the operating system environment of FIG. 1 in which one embodiment of the present invention may be implemented.

FIG. 2C is functional block diagram of an example process of obtaining permission to access a non-global zone object in the operating system environment of FIG. 1 in which one embodiment of the present invention may be implemented. As shown by FIG. 2C, process C 232 performs processing to obtain appropriate privilege from kernel 150 in order to access object A 244(a). The dotted line 123 indicates a request by process C 232 for an additional privilege from kernel 150 in order to be able to access object A 244(a). A dotted line 125 indicates a granting by kernel 150 of the appropriate privilege to process C 232. In one embodiment, the new privilege allows processes to override the restrictions placed on unprivileged processes. (In this case, the restriction is that unprivileged processes in the global zone cannot signal or control processes in other zones.) Further, in one embodiment, the privilege can be removed from a privileged process in order to restrict possibly destructive actions.

In an alternative embodiment, filtering based on the zone context of the opening process, rather than through use of a mount as described above with reference to FIG. 2B, can be used to limit access to certain processes within an instance of procfs. When a process in the global zone opens a procfs instance associated with another zone, it would actually see all processes in the system rather than just the ones associated with that zone. This embodiment differs from the embodiment discussed above with reference to FIG. 2B, in which a given procfs instance will export the same processes regardless of the context of the reader.

Sample Operation

A sample operation of the operating system 100 in accordance with one embodiment of the present invention will now be described. In the following discussion, reference will be made to the system diagram of FIGS. 2A-2C and the flow diagrams of FIGS. 3A-3H.

Figure 3A:
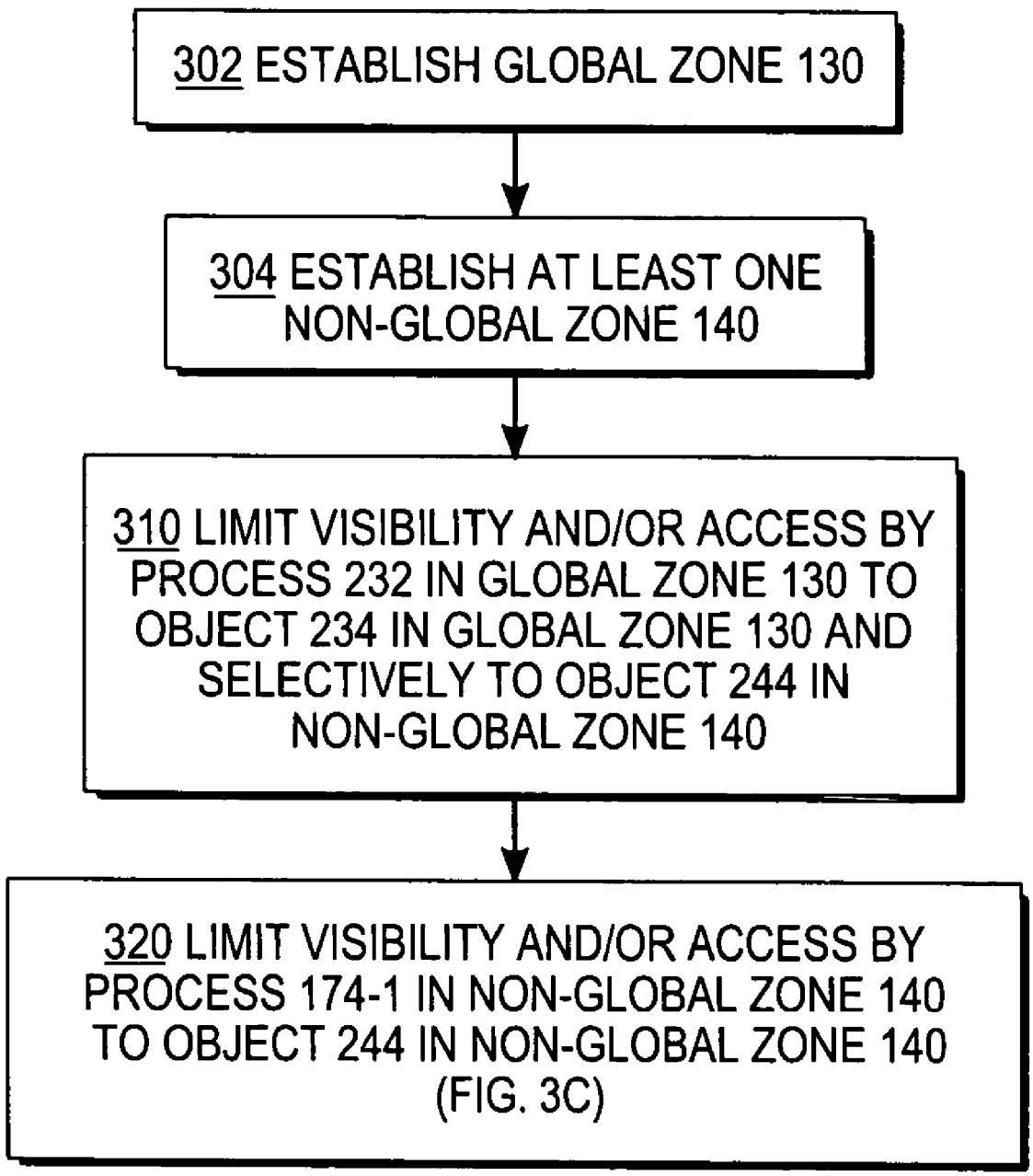

FIG. 3A is an operational flow diagram illustrating the operation of one embodiment of the present invention. In the embodiment discussed with reference to FIG. 3A, in block 302 global zone 130 is established. In block 304 non-global zone 140 is established. In block 310, visibility and/or access by process 232 associated with the global zone 130 is limited to object 234 associated with global zone 130, and selectively limited to object 244 in non-global zone 140, as is discussed in further detail with reference to FIG. 3B. In block 320, visibility and/or access by process 174-1 associated with non-global zone 140 is limited to object 244 in non-global zone 140, as is discussed in further detail with reference to FIG. 3C.

Referring to FIG. 3B, which is an operational flow diagram illustrating the operation of block 310 of FIG. 3A in one embodiment of the present invention, in block 312, visibility of object 234, in global zone 130, by a process 232 in the global zone 130 is enabled. Further, in that same block 312, visibility of object 244 in the non-global zone 140 by process 232 in the global zone 130 is enabled, as is discussed in further detail with reference to FIG. 3D. In block 314, access to object 234 in a global zone 130 a process 232 in the global zone 130 is enabled. Access to object 244 by process 232 in the global zone 130, however, is selectively restricted, as is discussed in further detail with reference to FIG. 3E.

Now referring to FIG. 3C, which is an operational flow diagram illustrating the operation of block 320 one FIG. 3A in one embodiment of the present invention, in block 322 visibility of object 244 in non-global zone 140 by process 174-1 in the non-global zone 140 is enabled. Visibility of the object 234 in the global zone 130 by process 174-1 in the non-global zone 140, however, is restricted, as is discussed in further detail with reference to FIG. 3F. In block 324, access to object 244 in non-global zone 140 by a process 174-1 in the non-global zone 140 is enabled. In that same block 324, access to object 234 in the global zone 130 by a process 174-1 in the non-global zone 140 is restricted, as is discussed in further detail with reference to FIG. 3G. In one embodiment, processing such as that described with reference to FIG. 3C blocks a process inside a zone, other than the global zone, from entering any other zones. This prevents a process running with privilege or authority (such as "super-user") in a zone from escaping the zone's root directory restriction in a manner similar to what is possible in conventional systems using the chroot command. In one embodiment, the zone's root directory is distinct from the directory set by chroot for processes within the zone. In one embodiment, both restrictions are checked in one embodiment, when a process is traversing pathname components. This enables chroot to be used within a zone, but if a process escapes from its chroot restriction, that process will still be unable to escape the zone restriction.

Referring to FIG. 3D, which is an operational flow diagram illustrating the operation of block 312 of FIG. 3B in one embodiment of the present invention, in block 332 an identifier associated with global zone 130 is received. Then in block 334, the process table from an operating system kernel 150 is reflected to a subdirectory of the root directory of the file system associated with the operating system.

Figure 3E:
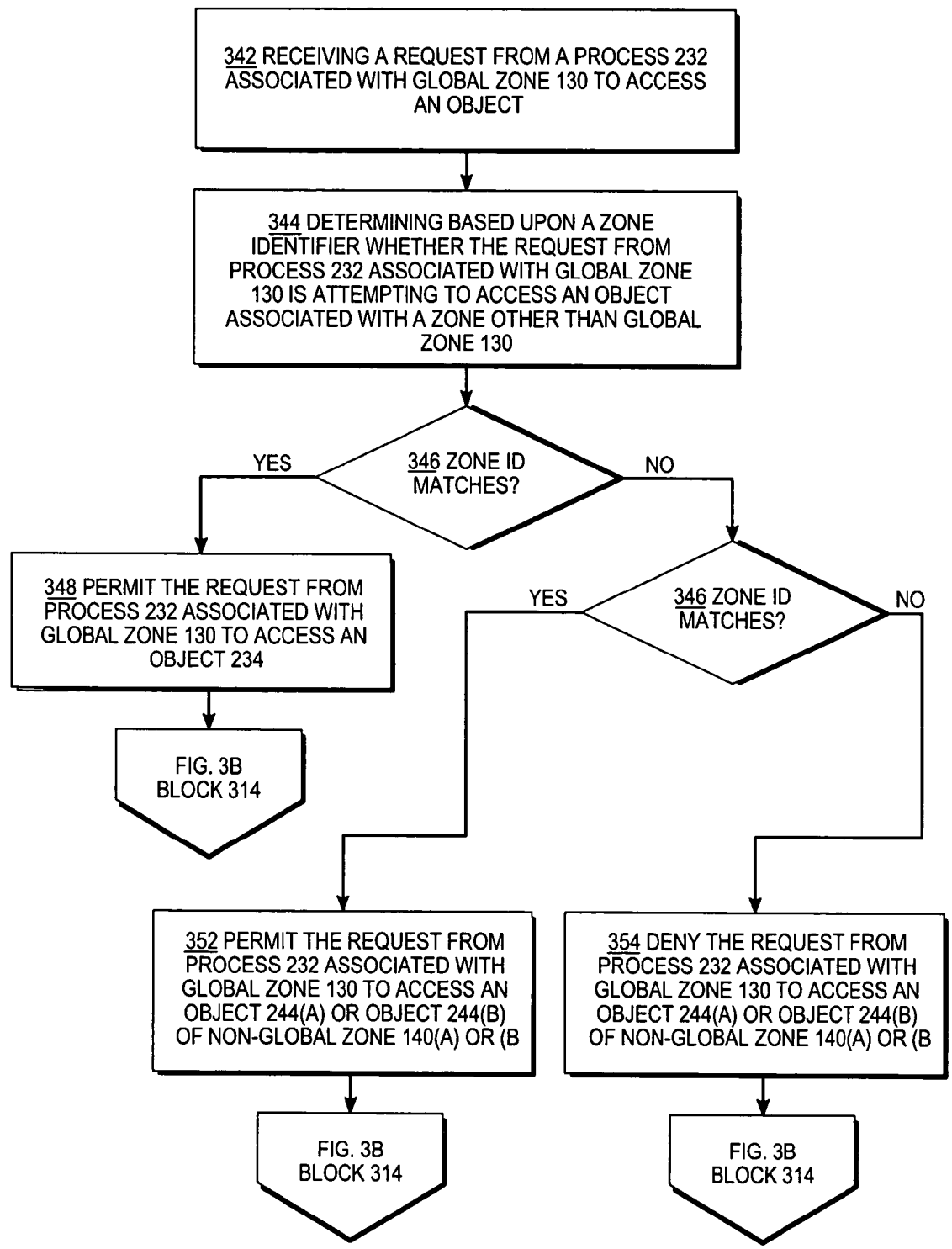

Referring to FIG. 3E, which is an operational flow diagram illustrating the operation of block 314 of FIG. 3B in one embodiment of the present invention, in block 342 a request from a process 232 associated with global zone 130 to access an object is received. In block 344, the step of determining based upon a zone identifier, whether the request from process 232 associated with global zone 130 is attempting to access an object associated with a zone other than global zone 130. In block 346, a test is performed to see if the zone ID of the requesting process and the zone ID of the object to be accessed match. If the zone IDs match, then in block 348, the request from process 232 associated with global zone 130 to access an object 234 is permitted. Otherwise, if the zone IDs do not match, then in block 350 a test is performed to see if the requesting process 232 is privileged. If the requesting process is privileged, then in block 352 the request from process 232 associated with global zone 130 to access an object 244(a) or object 244(b) of non-global zone 140(a) or zone 140(b) is permitted. Otherwise if the process 232 is not privileged, in block 354, the request from the process 232 is denied. In one embodiment, process 232 may request additional privilege using a process illustrated FIG. 3H.

Figure 3F:
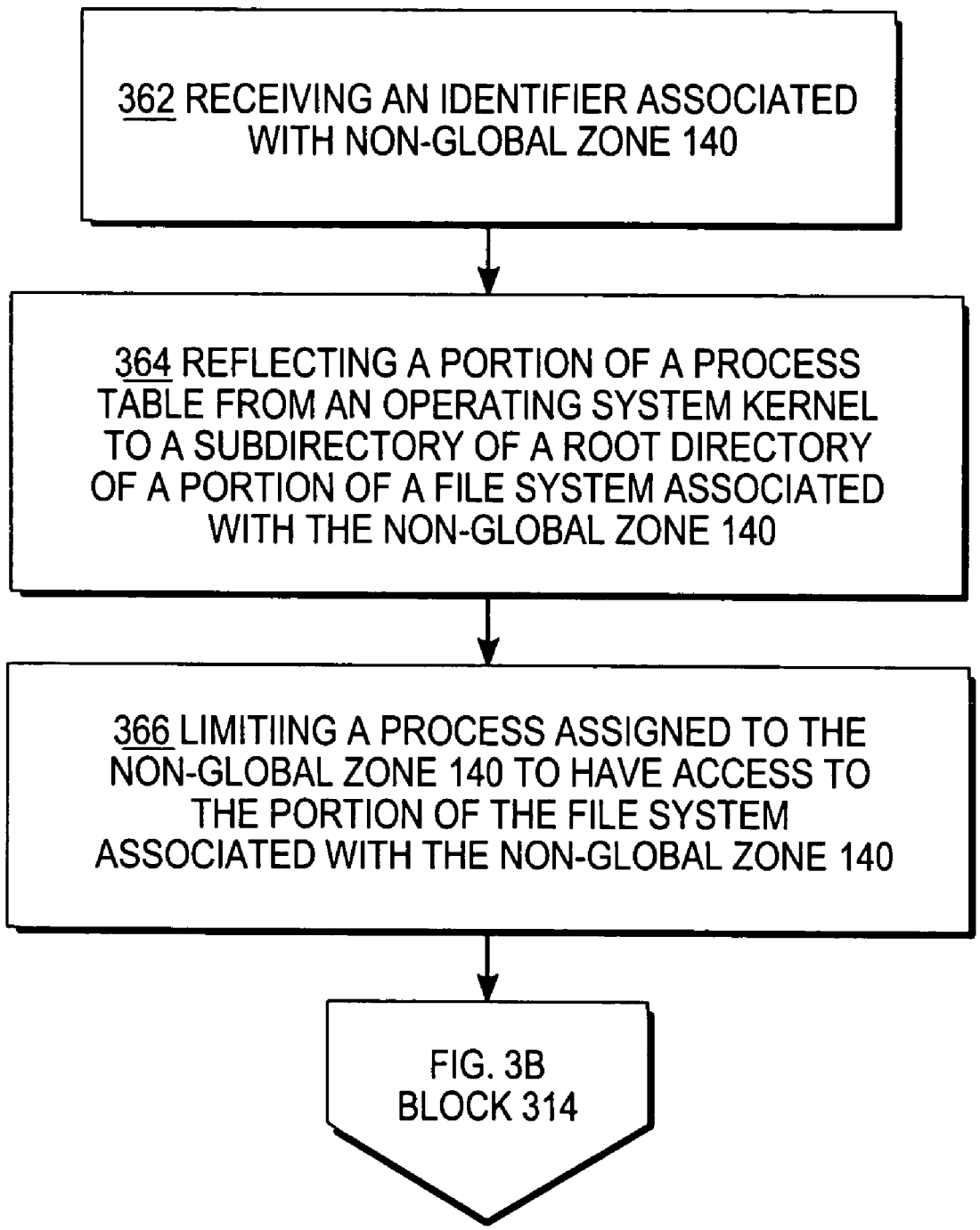

Referring to FIG. 3F, which is an operational flow diagram illustrating the operation of block 322 of FIG. 3C in one embodiment of the present invention, in block 362, identifier associated with non-global zone 140 is received. In block 364, a portion of a process table from an operating system kernel selected based upon the identifier is reflected to a subdirectory of a root directory of a portion of a file system associated with the non-global zone 140. Then in block 366, a process assigned to the non-global zone 140 is limited to having access to the portion of the file system associated with the non-global zone 140.

Figure 3G:
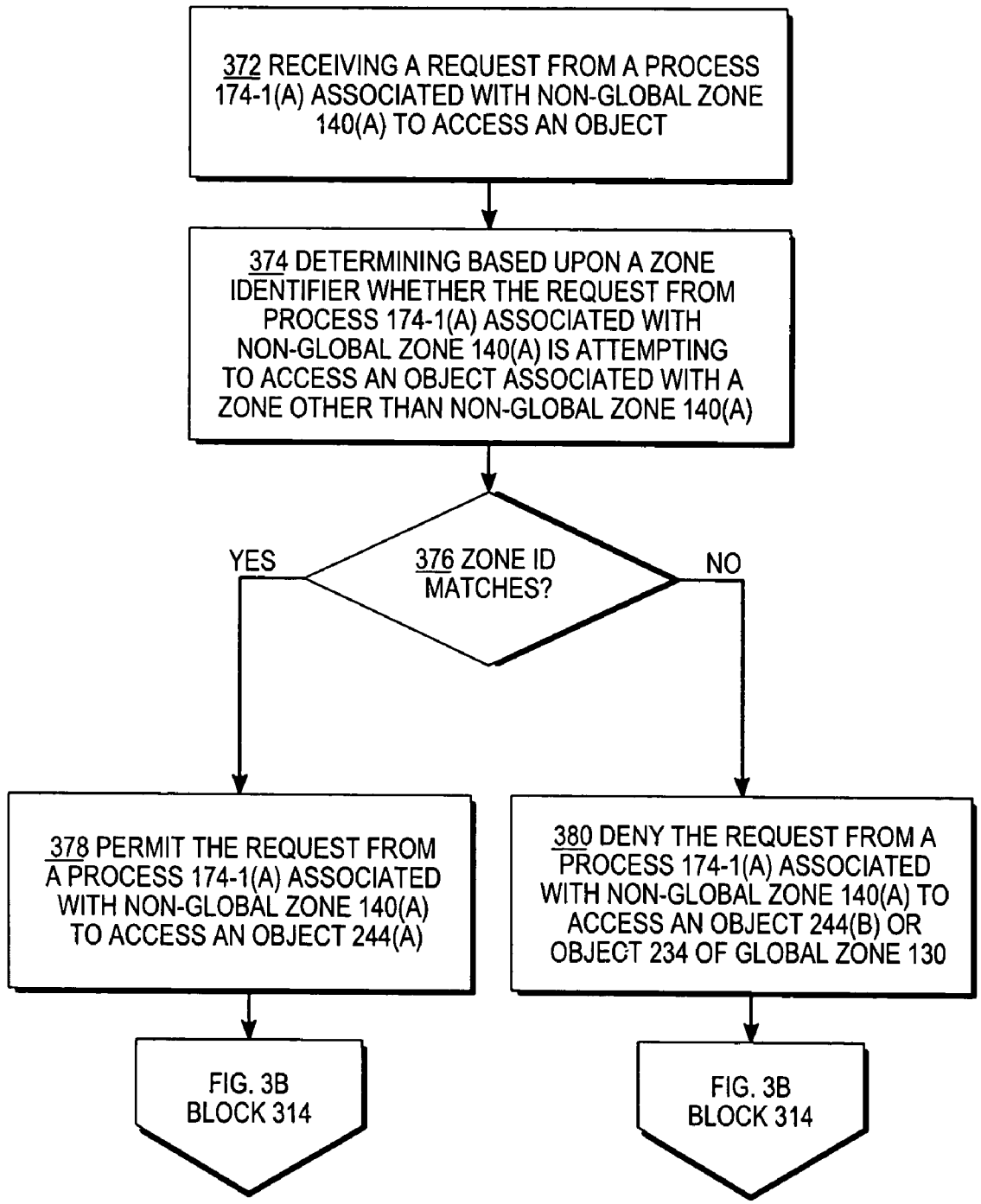

Referring to FIG. 3G, which is an operational flow diagram illustrating the operation of block 324 of FIG. 3C in one embodiment of the present invention, in block 372 a request from a process 174-1(a) associated with non-global zone 140(a) to access an object is received. In block 374, it is determined based upon the zone identifier whether the request from process 174-1(a) associated with non-global zone 140(a) is attempting to access an object associated with the zone other than not global zone 140(a). In block 376, a test of whether the zone ID of the process making the request and the zone ID of the object to be accessed match. If the zone ID's match then in block 378, the request from the process 174-1(a) is permitted. Otherwise, if the zone IDs do not match, then in block 380 the request from process 174-1(a) is denied.

Figure 3H:
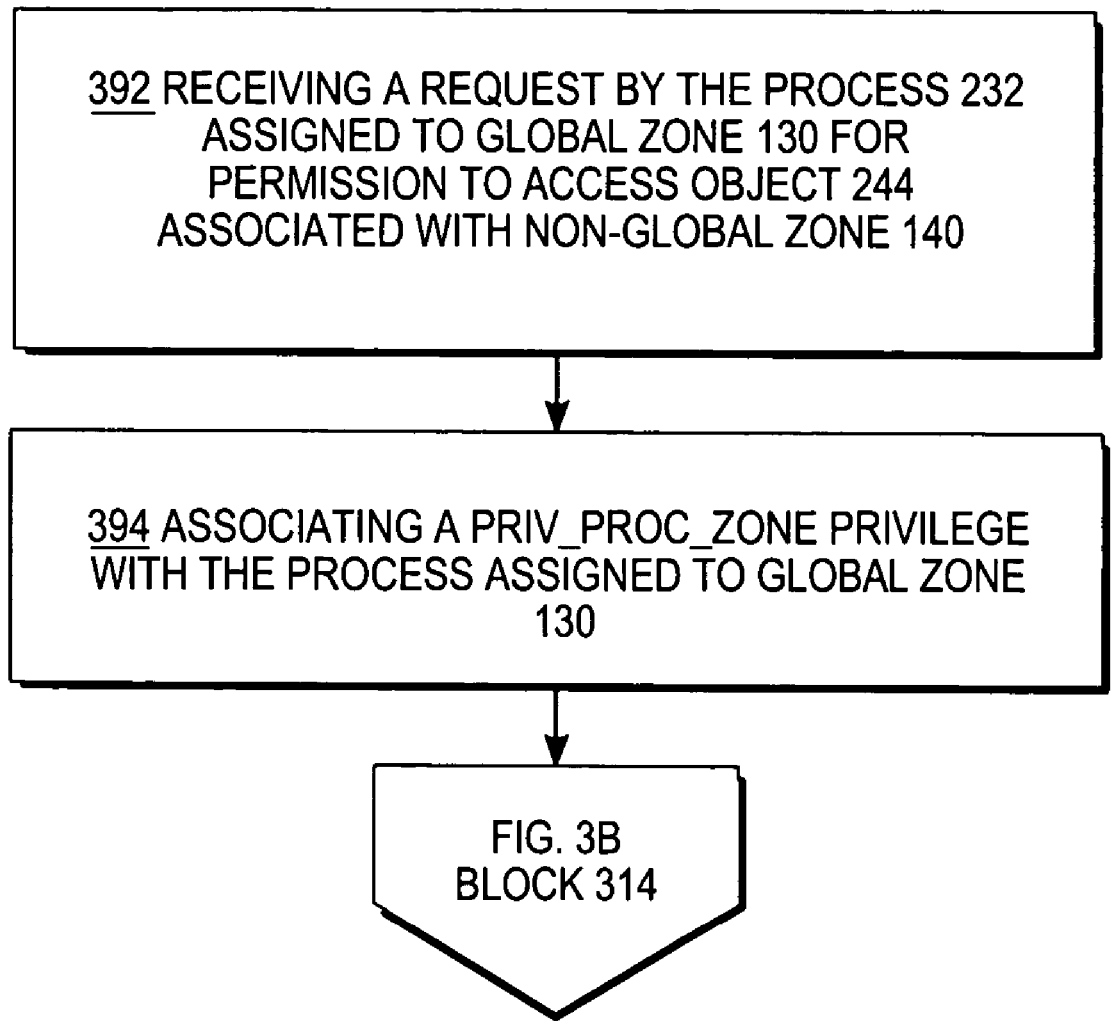

In the event that a request by a process 232 in the global zone 130 to access an object 244 in the global zone 140 has been denied, as was illustrated by block 354 of FIG. 3E, a request privilege process may be executed. As shown by FIG. 3H, which is an operational flow diagram illustrating the operation of one embodiment of the present invention, in block 392, a request by the process 232 assigned to global zone 130 for permission to access object 244 associated with non-global zone 140 is received. In block 394, a PRIV_PROC_ZONE privilege is associated with the process 232 assigned to global zone 130. The process 232 now has the capability to obtain access to the object 244 in the non-global zone 140 in accordance with processing illustrated by reference to FIG. 3E in one embodiment.

FIG. 4 is an example listing of processes present in one embodiment of the present invention. As shown in FIG. 4, shell commands may be used to retrieve information about the zones in existence and processes within the zones in one embodiment. A command 402 is a zoneadm(1M) command to observe zones existing in the computer system 100. The zoneadm command provides one way to manage zones that have been configured in computer system 100. In command line 402, the zoneadm command is invoked using a global# prefix, a list parameter and a –v flag. The global# prefix indicates that the 402 is directed to the global zone. The list parameter and the –v flag indicate that the command is requesting a listing of processes and that the list be "verbose," respectively. FIG. 4 illustrates a response 404 to the zoneadm command 402 which indicates that two zones are presently established in computer system 100: a first zone, named global, and a second zone, named my-zone, which is a non-global zone. Both zones are in the Running state and the path of the root directory of the global zone is /, while the path of the root directory of my-zone, is /aux0/my-zone.

The next two commands and responses illustrate the visibility of process 0 sched and 1 init which are made visible in the global zone exclusively in one embodiment. A second command 406, which is a ps command addressed to the global zone 140, instructs the zone to return the identities of processes visible or known to the global zone 140.

The ps utility displays a header line followed by lines containing information about the processes in the system 100. This information is sorted by process ID. The information displayed is selected based on a set of keywords (such as –L –O and –o options).

The global zone 140 responds with a response 408 to the ps command 406 with a series of lines that indicate a process id (PID) in a first column, a zone id (ZONEID) and a name of the process, including the directory path (COMMAND) for each of the processes known to the zone 140. A third command 410, also a ps command, is appended to a zlogin command directed to the non-global zone 140, my-zone, to instruct the non-global zone 140 to return the identities of processes visible or known to the non-global zone 140. The non-global zone 140 responds with a response 412 to the ps command 410 with a series of lines indicating a process id, a zone id and a name of the process, including its directory path, for each of the processes known to the zone 140. A comparison of response 408 and response 412 from the global and non-global zones, respectively, indicates that the processes 0 sched and 1 init are made visible in the global zone exclusively, in the illustrated embodiment. In one embodiment, any process in a non-global zone having a parent that is outside of the non-global zone containing the process appears to be parented by process zsched. The zsched process will appear to be parented by itself in one embodiment. Accordingly, legacy applications that expect a tree structure of processes, i.e., all processes would have a parent-child relationship with a common origin, can continue to function without modification even when executed in a zone in which unrelated processes coexist. Further, such embodiments do not need to expose the process id of the real parent process, which may belong to a global zone, for example. In this way, process information can be isolated to process information of only processes within a non-global zone, eliminating potential exposure of zone-external information to processes in the non-global zone.

Hardware Overview

Figure 5:
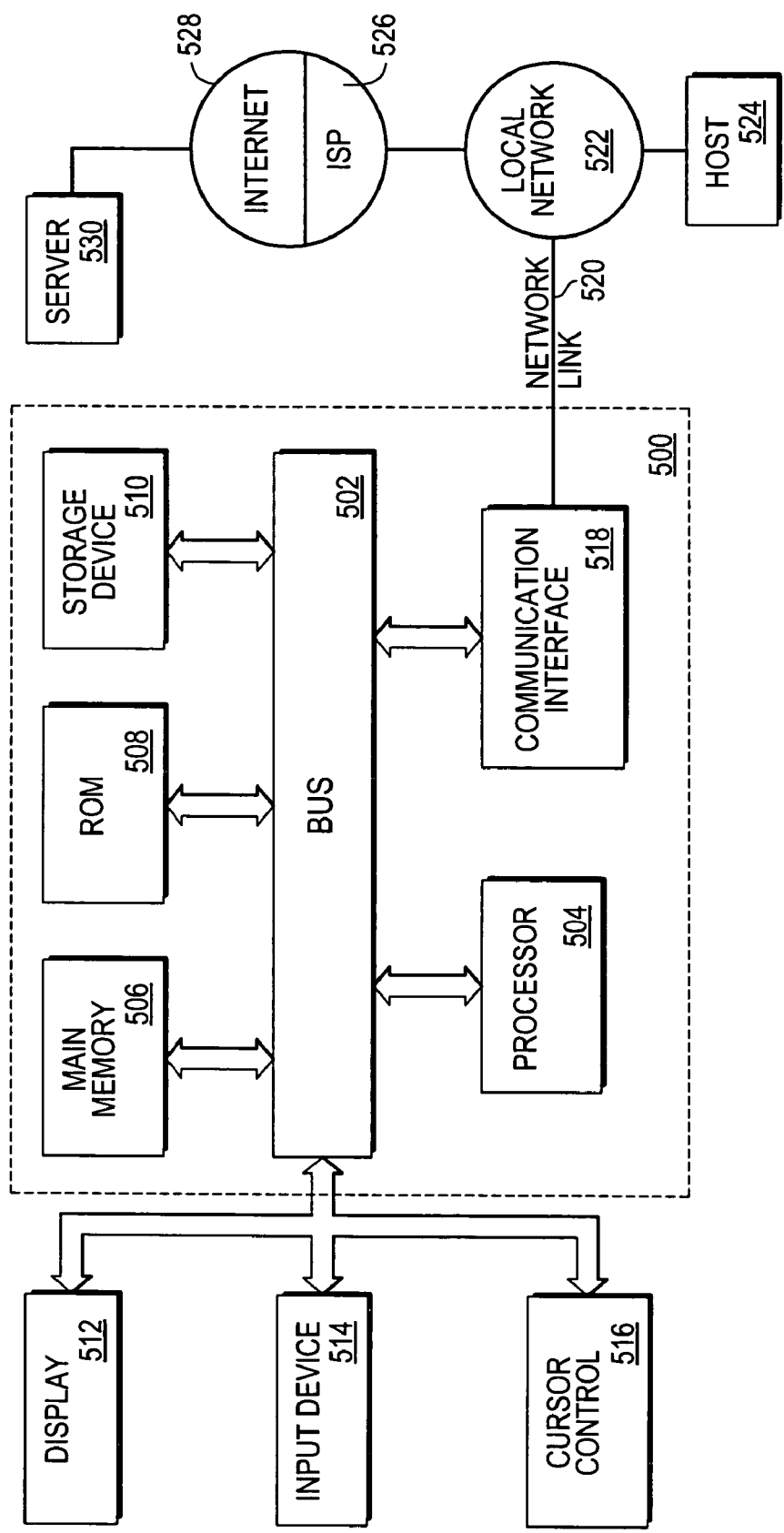
FIG. 5 is a hardware block diagram of an example computer system, which may be used to embody one or more components of an embodiment of the present invention.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may also be a medium (e.g. air) that enables signals to be capacitively exchanged between one or more of the components. Bus 502 may further be a network connection that connects one or more of the components. Overall, any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. In this instance, the bus 502 would be the medium (such as air) that enables this capacitive communication to take place. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques' described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A method comprising:
    establishing a global zone, wherein the global zone is a global operating system environment that can support execution of one or more processes;
    establishing a non-global zone within the global zone, wherein the non-global zone is a partition of the global operating system environment, wherein the non-global zone operates as a separate and distinct operating system environment, and wherein the non-global zone can support execution of one or more processes;
    isolating a first process executing within the non-global zone to the non-global zone so that the first process does not have visibility or access to processes and objects that are not associated with the non-global zone;
    permitting a second process executing within the global zone to have visibility and access to processes and objects associated with the global zone; and
    permitting the second process executing within the global zone to have access to processes and objects associated with the non-global zone, if the second process has a privilege to cross zone boundaries.

2. The method of claim 1,
    permitting the second process executing within the global zone to have visibility of processes and objects associated with the non-global zone without requiring the second process to have the privilege to cross zone boundaries.

3. The method of claim 1, the second process executing within the global zone to cross zone boundaries; and
    granting the second process the privilege to cross zone boundaries, if the second process is authorized to receive such a privilege.

4. The method of claim 1, wherein the non-global zone has a first zone identifier associated therewith, wherein processes and objects associated with the non-global zone have the first zone identifier associated therewith, and wherein isolating the first process to the non-global zone comprises:
    allowing the first process executing within the non-global zone to view or access a target process or object only if the target process or object has the first zone identifier associated therewith.

5. The method of claim 4, wherein the global zone has a second zone identifier associated therewith, wherein processes and objects associated with the global zone have the second zone identifier associated therewith, and wherein permitting the second process to have visibility and access to processes and objects associated with the global zone comprises:
    allowing the second process executing within the global zone to view and access an intended process or object if the intended process or object has the second zone identifier associated therewith.

6. The method of claim 1, further comprising:
    receiving an identifier indicating a zone selected from at least one of the global zone and the non-global zone; and
    mounting file system resources comprising processes to be executed in the zone indicated by the identifier to a portion of a file system associated with the zone indicated by the identifier;
    thereby enabling the processes of the file system resources to obtain at least one of visibility and access to objects within the zone corresponding to the identifier.

7. The method of claim 6, wherein the file system resources are mounted to a subdirectory of a root directory of a portion of a file system associated with the zone indicated by the identifier; thereby enabling processes expecting a tree like directory structure to execute within the zone indicated by the identifier.

8. The method of claim 6, further comprising:
    enabling select processes to be visible to all other processes in the global zone and the non-global zone.

9. The method of claim 6, wherein file system resources comprise processes to be executed in any zone, the method further comprising:

receiving a request by a requesting process to access processes in the file system resources; and limiting access to processes in the file system resources based upon the requesting process' relationship with a zone indicated in the request;

thereby enabling the processes of the file system resources to obtain at least one of visibility and access to objects within the zone corresponding to the identifier.

10. The method of claim 1, further comprising:

providing information about the zone with which a process is associated based upon identity of a requesting process and relationship between the requesting process and the zone.

11. A computer readable storage medium, comprising:

instructions for causing one or more processors to establish a global zone, wherein the global zone is a global operating system environment that can support execution of one or more processes;

instructions for causing one or more processors to establish a non-global zone within the global zone, wherein the non-global zone is a partition of the global operating system environment, wherein the non-global zone operates as a separate and distinct operating system environment, and wherein the non-global zone can support execution of one or more processes;

instructions for causing one or more processors to isolate a first process executing within the non-global zone to the non-global zone so that the first process does not have visibility or access to processes and objects that are not associated with the non-global zone;

instructions for causing one or more processors to permit a second process executing within the global zone to have visibility and access to processes and objects associated with the global zone; and instructions for causing one or more processors to permit the second process executing within the global zone to have access to processes and objects associated with the non-global zone, if the second process has a privilege to cross zone boundaries.

12. The computer readable storage medium of claim 11, further comprising:

instructions for causing one or more processors to permit the second process executing within the global zone to have visibility of processes and objects associated with the non-global zone without requiring the second process to have the privilege to cross zone boundaries.

13. The computer readable storage medium of claim 11, further comprising:

instructions for causing one or more processors to receive a request from the second process executing within the global zone to cross zone boundaries; and granting the second process the privilege to cross zone boundaries, if the second process is authorized to receive such a privilege.

14. The computer readable storage medium of claim 11, wherein the non-global zone has a first zone identifier associated therewith, wherein processes and objects associated with the non-global zone have the first zone identifier associated therewith, and wherein the instructions for causing one or more processors to isolate the first process to the non-global zone comprises:

instructions for causing one or more processors to allow the first process executing within the non-global zone to view or access a target process or object only if the target process or object has the first zone identifier associated therewith.

15. The computer readable storage medium of claim 14, wherein the global zone has a second zone identifier associated therewith, wherein processes and objects associated with the global zone have the second zone identifier associated therewith, and wherein the instructions for causing one or more processors to permit the second process to have visibility and access to processes and objects associated with the global zone comprises:

instructions for causing one or more processors to allow the second process executing within the global zone to view and access an intended process or object if the intended process or object has the second zone identifier associated therewith.

16. The computer readable storage medium of claim 11, further comprising:

instructions for causing one or more processors to receive an identifier indicating a zone selected from at least one of the global zone and the non-global zone; and instructions for causing one or more processors to mount file system resources comprising processes to be executed in the zone indicated by the identifier to a portion of a file system associated with the zone indicated by the identifier.

17. The computer readable storage medium of claim 16, wherein the file system resources are mounted to a subdirectory of a root directory of a portion of a file system associated with the zone indicated by the identifier;

thereby enabling processes expecting a tree like directory structure to execute within the zone indicated by the identifier.

18. The computer readable storage medium of claim 16, further comprising:

instructions for causing one or more processors to enable select processes to be visible to all other processes in the global zone and the non-global zone.

19. The computer readable storage medium of claim 16, wherein file system resources comprise processes to be executed in any zone, and wherein the computer readable storage medium further comprises:

instructions for causing one or more processors to receive a request by a requesting process to access processes in the file system resources; and instructions for causing one or more processors to limit access to processes in the file system resources based upon a requesting process' relationship with a zone indicated in the request.

20. The computer readable storage medium of claim 11, further comprising:

instructions for causing one or more processors to provide information about the zone with which a process is associated based upon identity of a requesting process and relationship between the requesting process and the zone.

21. An apparatus, comprising:

means for establishing a global zone, wherein the global zone is a global operating system environment that can support execution of one or more processes;

means for establishing a non-global zone within the global zone, wherein the non-global zone is a partition of the global operating system environment, wherein the non-global zone operates as a separate and distinct operating system environment, and wherein the non-global zone can support execution of one or more processes;

means for isolating a first process executing within the non-global zone to the non-global zone so that the first process does not have visibility or access to processes and objects that are not associated with the non-global zone;

means for permitting a second process executing within the global zone to have visibility and access to processes and objects associated with the global zone; and means for permitting the second process executing within the global zone to have access to processes and objects associated with the non-global zone, if the second process has a privilege to cross zone boundaries.

22. A system, comprising:

one or more processors; and a storage comprising:

instructions for causing the one or more processors to establish a global zone, wherein the global zone is a global operating system environment that can support execution of one or more processes;

instructions for causing the one or more processors to establish a non-global zone within the global zone, wherein the non-global zone is a partition of the global operating system environment, wherein the non-global zone operates as a separate and distinct operating system environment, and wherein the non-global zone can support execution of one or more processes;

instructions for causing the one or more processors to isolate a first process executing within the non-global zone to the non-global zone so that the first process does not have visibility or access to processes and objects that are not associated with the non-global zone;

instructions for causing the one or more processors to permit a second process executing within the global zone to have visibility and access to processes and objects associated with the global zone; and instructions for causing the one or more processors to permit the second process executing within the global zone to have access to processes and objects associated with the non-global zone, if the second process has a privilege to cross zone boundaries.

\* \* \* \* \*

UNITED STATES PATENT AND TRADEMARK OFFICE
CERTIFICATE OF CORRECTION

PATENT NO.         : 7,437,556 B2
APPLICATION NO. : 10/763147
DATED               : October 14, 2008
INVENTOR(S)       : Andrew G. Tucker et al.

It is certified that error appears in the above-identified patent and that said Letters Patent is hereby corrected as shown below:

Claim 3, lines 1-2, replace "The method of claim 1, the second process executing within the global zone to cross zone boundaries; and" with --The method of claim 1, further comprising:
    receiving a request from the second process executing within the global zone to cross zone boundaries; and--

Signed and Sealed this

Third Day of February, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,437,556 B2 |
| APPLICATION NO. | : 10/763147 |
| DATED | : October 14, 2008 |
| INVENTOR(S) | : Andrew G. Tucker et al. |

Page 1 of 1

It is certified that error appears in the above-identified patent and that said Letters Patent is hereby corrected as shown below:

Column 18, Claim 3, lines 20-21, replace "The method of claim 1, the second process executing within the global zone to cross zone boundaries; and" with --The method of claim 1, further comprising:
    receiving a request from the second process executing within the global zone to cross zone boundaries; and--

This certificate supersedes the Certificate of Correction issued February 3, 2009.

Signed and Sealed this

Twenty-fourth Day of February, 2009

JOHN DOLL
*Acting Director of the United States Patent and Trademark Office*